(12) United States Patent
Li et al.

(10) Patent No.: US 10,104,707 B2
(45) Date of Patent: Oct. 16, 2018

(54) WI-FI DIRECT SERVICES MECHANISMS FOR WIRELESS GIGABIT DISPLAY EXTENSION

(71) Applicant: INTEL CORPORATION, Santa Clara, CA (US)

(72) Inventors: Guoqing Li, Portland, OR (US); Bahareh Sadeghi, Portland, OR (US); Emily Qi, Gig Harbor, WA (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/118,085

(22) PCT Filed: Sep. 26, 2014

(86) PCT No.: PCT/US2014/057850
§ 371 (c)(1),
(2) Date: Aug. 10, 2016

(87) PCT Pub. No.: WO2015/119665
PCT Pub. Date: Aug. 13, 2015

(65) Prior Publication Data
US 2016/0360565 A1    Dec. 8, 2016

Related U.S. Application Data

(60) Provisional application No. 61/938,002, filed on Feb. 10, 2014.

(51) Int. Cl.
*H04W 76/14* (2018.01)
*H04W 76/10* (2018.01)
(Continued)

(52) U.S. Cl.
CPC .......... *H04W 76/14* (2018.02); *H04L 67/104* (2013.01); *H04L 67/141* (2013.01);
(Continued)

(58) Field of Classification Search
None
See application file for complete search history.

(56) References Cited

U.S. PATENT DOCUMENTS 9,398,065 B2    7/2016    Kambhatla
2005/0091302 A1    4/2005    Soin et al.
(Continued)

FOREIGN PATENT DOCUMENTS

WO    2013095517 A1    6/2013

OTHER PUBLICATIONS

International Search Report, dated Jan. 12, 2015, Application No. PCT/US2014/057850, Filed Date: Sep. 26, 2014, pp. 3.
(Continued)

*Primary Examiner* — Diane Lo

(57) ABSTRACT

Techniques for implementing Wireless Gigabit (WiGig) Display Extension (WDE) communications as Wi-Fi Direct Services (WFDS) services are described. According to such techniques, WDE services may make use of primitives and events obtained from a WFDS application service platform (ASP). This application of WFDS to WDE may provide necessary mechanisms for layer 2 operations such as device and service discovery, P2P connection management, and session management. Other embodiments are described and claimed.

22 Claims, 12 Drawing Sheets

(51) Int. Cl.
    *H04W 8/00*     (2009.01)
    *H04L 29/08*    (2006.01)
    *H04W 84/12*    (2009.01)
    *H04W 76/02*    (2009.01)

(52) U.S. Cl.
    CPC .......... *H04L 67/143* (2013.01); *H04W 8/005* (2013.01); *H04W 76/02* (2013.01); *H04W 76/023* (2013.01); *H04W 76/10* (2018.02); *H04L 2212/00* (2013.01); *H04W 84/12* (2013.01)

(56) References Cited

U.S. PATENT DOCUMENTS

| | | | |
|---|---|---|---|
| 2011/0075642 A1 | 3/2011 | Cordeiro et al. | |
| 2012/0243524 A1 | 9/2012 | Verma et al. | |
| 2013/0128948 A1* | 5/2013 | Rabii | H04N 19/12 375/240.01 |
| 2013/0185447 A1 | 7/2013 | Nagawade et al. | |
| 2013/0268621 A1* | 10/2013 | Mese | H04N 19/176 709/217 |
| 2014/0022146 A1 | 1/2014 | Thangadorai et al. | |
| 2014/0351445 A1 | 11/2014 | Davidson et al. | |
| 2015/0173001 A1* | 6/2015 | Huang | H04L 67/16 370/254 |
| 2016/0278144 A1 | 9/2016 | Lee et al. | |
| 2016/0337457 A1* | 11/2016 | Kim | H04L 67/16 |

OTHER PUBLICATIONS

Extended European Search Report received for European Patent Application No. 14881482.5, dated Jul. 4, 2017, 10 pages.

* cited by examiner

| Octets: | | 1 | 1 | 1 | 3 | 2 | | |
|---|---|---|---|---|---|---|---|---|
| 802.11 MAC Header | | 0xAA (SNAP) | 0xAA (SNAP) | 0x03 (UI) | 0x50-6F-9A (Wi-Fi Alliance) | 0x??-00 (WFDS OUI Type) | ASP Coordination Protocol Data | FCS |
| 702 | | 706 DSAP | 708 SSAP | 710 Control | 714 Protocol Identification | 716 | 718 | 720 |

←—— LLC Header 704 ——→  ←—— SNAP Header 712 ——→

FIG. 8
800

| Octets: | | 1 | 1 | 1 | 3 | 2 | | |
|---|---|---|---|---|---|---|---|---|
| 802.11 MAC Header | | 0xAA (SNAP) | 0xAA (SNAP) | 0x03 (UI) | 0x50-6F-9A (Wi-Fi Alliance) | 0x??-00 (WDE OUI Type) | WDE Protocol Data | FCS |
| 802 | | 806 DSAP | 808 SSAP | 810 Control | 814 Protocol Identification | 816 | 818 | 820 |

←—— LLC Header 804 ——→  ←—— SNAP Header 812 ——→

FIG. 9

_Storage Medium 900_

*Computer-Executable Instructions 902*

WI-FI DIRECT SERVICES MECHANISMS FOR WIRELESS GIGABIT DISPLAY EXTENSION

RELATED CASE

This application is a national stage application claiming the benefit of and priority to International Application No. PCT/US2014/057850 entitled "WI-FI DIRECT SERVICES MECHANISMS FOR WIRELESS GIGABIT DISPLAY EXTENSION" filed Sep. 26, 2014, which claims priority to U.S. Provisional Patent Application Number 61/938,002, filed Feb. 10, 2014, both of which are hereby incorporated by reference in their entirety.

TECHNICAL FIELD

Embodiments described herein generally relate to wireless communications.

BACKGROUND

Wireless Gigabit (WiGig) generally refers to a collection of wireless communications standards that allow multi-gigabit wireless communications between devices. The Wireless Gigabit Alliance, which developed and published WiGig standards beginning in 2009, became part of the Wi-Fi Alliance (WFA) in March 2013. Currently, the WFA is developing a specification for a WiGig Display Extension (WDE) to support multi-gigabit wireless transmission of audio/visual data to devices such as high-definition televisions (HDTVs), monitors, projectors, and other peripherals. However, to date, sufficient implementation details for layer 2 mechanisms such as device and service discovery, peer-to-peer (P2P) connection management, and layer 2 session management have not been defined for WDE. This disclosure is directed at enabling the realization of such layer 2 mechanisms by employing Wi-Fi Direct Services (WFDS) protocols in conjunction with WDE. Generally speaking, according to the techniques described herein, WDE communications may be implemented as WFDS services.

BRIEF DESCRIPTION OF THE DRAWINGS

FIG. 7 illustrates one embodiment of a first packet structure.
FIG. 8 illustrates one embodiment of a second packet structure.
FIG. 9 illustrates one embodiment of a storage medium.

DETAILED DESCRIPTION

Techniques for implementing Wireless Gigabit (WiGig) Display Extension (WDE) communications as Wi-Fi Direct Services (WFDS) services are described. According to such techniques, WDE services may make use of primitives and events obtained from a WFDS application service platform (ASP). This application of WFDS to WDE may provide necessary mechanisms for layer 2 operations such as device and service discovery, P2P connection management, and session management. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
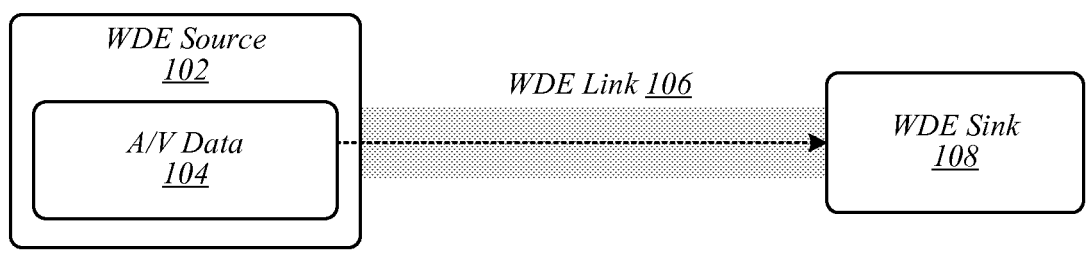
FIG. 1 illustrates one embodiment of an operating environment.

FIG. 1 illustrates an example of an operating environment 100 such as may be representative of various embodiments. As shown in FIG. 1, in operating environment 100, a WDE source 102 sends audio/visual (A/V) data 104 over a WDE link 106 to a WDE sink 108. A/V data 104 may comprise logic, data, and/or information corresponding to visual and/or audio content, and usable by WDE sink 108 to present that visual and/or audio content. For example, A/V data 104 may correspond to a video, and WDE source 102 may send A/V data 104 to WDE sink 108 in order to view that video on a screen of WDE sink 108. WDE source 102 may comprise any device or combination of devices collectively capable of operating in a WDE source mode to transmit A/V data 104 over WDE link 106. Examples of WDE source 102 may include a WDE-capable tablet, notebook, laptop, or desktop computer, a WDE-capable mobile communications device such as a smartphone, cellular phone, or other type of mobile phone, a WDE-capable gaming console or gaming device, and a WDE-capable appliance or other consumer electronic device. The embodiments are not limited to these examples.

WDE sink 108 may comprise any device or combination of devices collectively capable of operating in a WDE sink mode, receiving A/V data 104 over WDE link 106, and presenting the visual and/or audio content embodied in A/V data 104. In various embodiments, WDE sink 108 may comprise a single WDE-capable display or other content presentation device possessing these capabilities, such as a WDE-capable television, monitor, projector, or other peripheral. In some other embodiments, WDE sink 108 may comprise a display and one or more other devices that, when used in combination with the display, allow A/V data 104 to be received over WDE link 106 and presented on the display. In various such embodiments, for example, WDE sink 108 may comprise an adapter that operates in a WDE sink mode and receives A/V data 104 from device 102 over WDE link 106, and may comprise a display or other content presentation device that receives the A/V data 104 from the adapter and presents the visual and/or audio content embodied in the A/V data 104. The embodiments are not limited in this context.

In order to establish and make use of WDE link 106, WDE source 102 and/or WDE sink 108 may require the use of various layer 2 mechanisms, such as device and service discovery, P2P connection management, and layer 2 session management mechanisms. For example, without defined device and service discovery mechanisms, WDE source 102 may not be able to determine that WDE sink 108 is operating in that capacity, and thus WDE source 102 may not establish WDE link 106 with WDE sink 108. In some embodiments, one or more such layer 2 mechanisms may be realized by implementation of WFDS protocols in conjunction with WDE.

Figure 2:
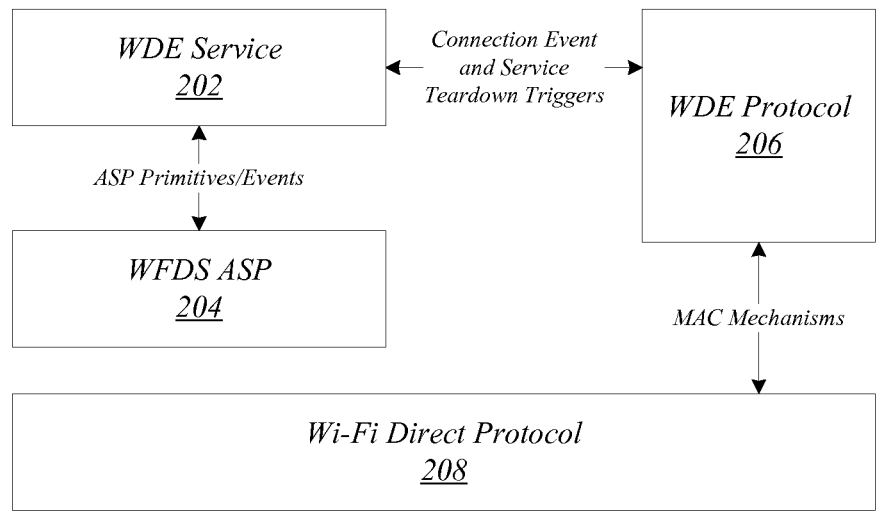
FIG. 2 illustrates one embodiment of a logical architecture.

FIG. 2 illustrates an embodiment of a logical architecture 200 such as may be representative of the use of WFDS protocols in conjunction with WDE in various embodiments, such as operating environment 100 of FIG. 1. In some embodiments, the implementation of logical architecture 200 may allow WDE links to be handled as WFDS services, and established via WFDS service setup procedures. As shown in FIG. 2, a WDE service 202 is defined that obtains primitives and events from a WFDS application service platform (ASP) 204. The WDE service 202 may utilize the primitives and events that it obtains from WFDS ASP 204 to perform service discovery and connection setup operations. The WDE service 202 may receive connection event and service teardown triggers from WDE protocol 206. In various embodiments, WDE protocol 206 may comprise the WDE protocol defined in the WDE specification announced in conjunction with the release of WiGig specification 1.1 in June 2011, or any predecessor, successor, progeny, or variant thereof. Communications according to WDE protocol 206 may be performed using media access control (MAC) mechanisms specified in Wi-Fi Direct protocol 208. In some embodiments, Wi-Fi Direct protocol 208 may comprise the WFA Wi-Fi Direct standard, 2010 Release, or any predecessor, successor, progeny, or variant thereof. The embodiments are not limited in this context.

Figure 3:
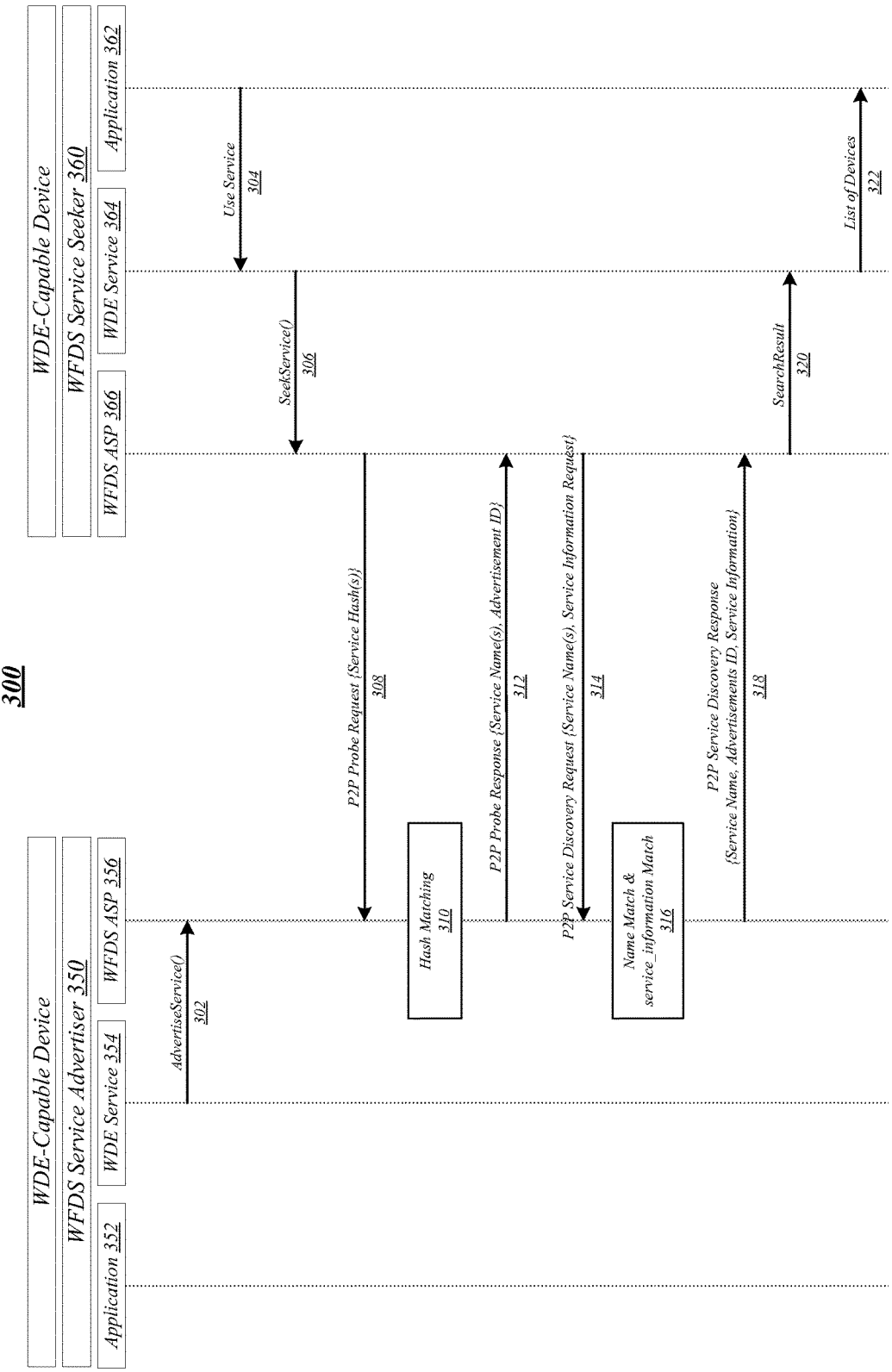
FIG. 3 illustrates one embodiment of a first communications flow.

FIG. 3 illustrates a communications flow 300 that may be representative of a first phase of a WDE service setup process such as may be performed in various embodiments to enable the establishment of a WDE link, such as WDE link 106 of FIG. 1. More particularly, communications flow 300 may be representative of a service discovery phase of such a WDE service setup process. In communications flow 300, communications are exchanged between two WDE-capable devices. Namely, communications are exchanged between a WDE-capable device operating as a WFDS service advertiser 350 and a WDE-capable device operating as a WFDS service seeker 360. One of the WDE-capable devices may comprise a WDE source that wishes to transmit content, such as WDE source 102 of FIG. 1. The other WDE-capable device may comprise a WDE sink that is to receive and cause presentation of that content, such as WDE sink 108 of FIG. 1.

In some embodiments, the WDE-capable device that comprises a WDE source may operate as the WFDS service seeker 360, and the WDE-capable device that comprises a WDE sink may operate as the WFDS service advertiser 350. In various other embodiments, the WDE-capable device that comprises the WDE source may operate as the WFDS service advertiser 350, and the WDE-capable device that comprises the WDE sink may operate as the WFDS service seeker 360. In some embodiments, these roles may be mandated, such that the WDE source always assumes one WFDS role while the WDE sink always assumes the other WFDS role. For example, in various embodiments, it may be mandated that the WDE source always operates as the WFDS service seeker 360 and the WDE sink always operates as the WFDS service advertiser 350. In some other embodiments, these roles may not be mandated, such that either the WDE source or the WDE sink can operate as the WFDS service seeker 360, while the other device operates as the WFDS service advertiser 350. The embodiments are not limited in this context.

As shown in FIG. 3, the WFDS service advertiser 350 (hereinafter, "advertiser 350") comprises several logical modules. Advertiser 350 comprises a WDE service module 354, which may comprise programming, functions, logic, parameters, and/or other information operative to implement WDE capabilities for advertiser 350. Advertiser 350 also comprises an application module 352, which may comprise programming, functions, logic, parameters, and/or other information embodying an application that is to utilize WDE capabilities implemented by WDE service module 354. Advertiser 350 also comprises a WFDS ASP module 356, which may comprise programming, functions, logic, parameters, and/or other information operative to implement a WFDS ASP from which WDE service module 354 may obtain ASP primitives and/or events. Similarly, the WFDS service seeker 360 (hereinafter, "seeker 360") comprises an application module 362, a WDE service module 364, and a WFDS ASP module 366, each of which may be the same as or similar to its counterpart within advertiser 350. The embodiments are not limited in this context.

Communications flow 300 may begin at 302, where WDE service module 354 may send an AdvertiseService( ) command to WFDS ASP module 356, to indicate that WDE services are to be advertised on behalf of advertiser 350. In various embodiments, the AdvertiseService( ) command may include a service_name parameter. In some such embodiments, the service_name parameter may comprise the format "org.wi-fi.WDE.device.[source or sink].[interface]." In such embodiments, the [source or sink] element may comprise a value of either "source" or "sink" depending on the prospective role of advertiser 350 in conjunction with the advertised WDE service, and the [interface] element may comprise a value of "HDMI" if the advertised service involves use of an HDMI protocol or may comprise a value of "DisplayPort" if the advertised service involves use of a DisplayPort protocol. In various embodiments, the service_name parameter may comprise the format "org.wi-fi.WDE.device.[source or sink].[interface].[video and/or audio]." In such embodiments, the [video and/or audio] element may comprise a value of "video" if the advertised WDE service supports only video, may comprise a value of "audio" if the advertised WDE service supports only audio, and may comprise a value of "video and audio" if the advertised WDE service supports both video an audio.

In some embodiments, the AdvertiseService( ) command may include a service_information parameter that describes WDE capabilities of advertiser 350. In various embodiments, the service_information parameter may comprise a UTF-8 text string. In some embodiments, the service_information parameter may include the element "WDEServiceInformation." The embodiments are not limited in this context.

At 304, application module 362 may send a Use Service instruction 304 to WDE service module 364 to indicate the desire to locate a WDE service for use by seeker 360. In response to the Use Service instruction 304, WDE service module 364 may send a SeekService( ) command to WFDS ASP module 366 at 306. The SeekService( ) command may indicate that WDE services are to be sought on behalf of seeker 360. In various embodiments, the SeekService( )

command may include a service_name parameter. In some such embodiments, the service_name parameter may comprise the format "org.wi-fi.WDE.device.[source or sink].[interface]." In such embodiments, the [source or sink] element may comprise a value of either "source" or "sink" depending on the prospective role of seeker 360 in conjunction with the sought WDE service, and the [interface] element may comprise a value of "HDMI" if seeker 360 seeks a WDE service that uses an HDMI protocol or may comprise a value of "DisplayPort" if seeker 360 seeks a WDE service that uses a DisplayPort protocol.

In various embodiments, the service_name parameter may comprise the format "org.wi-fi.WDE.device.[source or sink].[interface].[video and/or audio]." In such embodiments, the [video and/or audio] element may comprise a value of "video" if the sought WDE service only needs to support video, may comprise a value of "audio" if the sought WDE service only needs to support audio, and may comprise a value of "video and audio" if the sought WDE service needs to support both video an audio. In some embodiments, the SeekService( ) command may include a service_information_request parameter. In various such embodiments, the service_information_request parameter may comprise a substring of a received service_information parameter or may comprise a null string. The embodiments are not limited in this context.

At 308, WFDS ASP module 366 may send a P2P Probe Request to WFDS ASP module 356. The P2P Probe Request may contain one or more service hashes. At 310, following receipt of the P2P Probe Request, WFDS ASP module 356 may perform a hash matching process to identify one or more service names and/or advertisement IDs matching the service hashes in the P2P Probe Request. At 312, WFDS ASP module 356 may send a P2P Probe Response to WFDS ASP module 366, and the P2P Probe Response may comprise the one or more service names and/or advertisement IDs identified during the hash matching process.

In various embodiments, seeker 360 and advertiser 350 may identify their device names in the P2P Probe Request and the P2P Probe Response, respectively, by specifying user-friendly descriptions in the Device Name attributes of the Wi-Fi Simple Configuration (WSC) information elements (IEs) in the P2P Probe Request and the P2P Probe Response. In some embodiments, seeker 360 and advertiser 350 may report their P2P capabilities by including appropriate category IDs and subcategory IDs in the primary device type attributes in any Beacon Frames and/or Probe Responses that they transmit. In various embodiments, seeker 360 and advertiser 350 may report their WDE service availability by setting appropriate values of availability bits in the Device Capability Bitmap fields of the P2P Capability attributes in the P2P IEs in any Beacon Frames, Probe Requests, and/or Probe Responses that they transmit. In some embodiments, when an availability bit for a given WDE device indicates that the WDE device is unavailable, it may indicate that all WDE services associated with that WDE device are unavailable. The embodiments are not limited in this context.

At 314, WFDS ASP module 366 may send a P2P Service Discovery Request to WFDS ASP module 356, and the P2P Service Discovery Request may comprise one or more service names and/or service information requests. At 316, WFDS ASP module 356 may perform name matching and service information matching techniques to identify advertisement IDs and service information for services identified in the P2P Service Discovery Request. At 318, WFDS ASP module 356 may send a P2P Service Discovery Response to WFDS ASP module 366, and the P2P Service Discovery Response may comprise the services names and corresponding advertisement IDs and service information.

At 320, WFDS ASP module 366 may generate a SearchResult based on the P2P Service Discovery Response. At 322, WDE service module 364 may send a message to application module 362 that comprises a list of one or more devices advertising the WDE service sought by seeker 360. Based on the information received from WFDS ASP module 356 in the P2P Service Discovery Response, WDE service module 364 may include advertiser 350 in this list of devices. The embodiments are not limited in this context.

Figure 4:
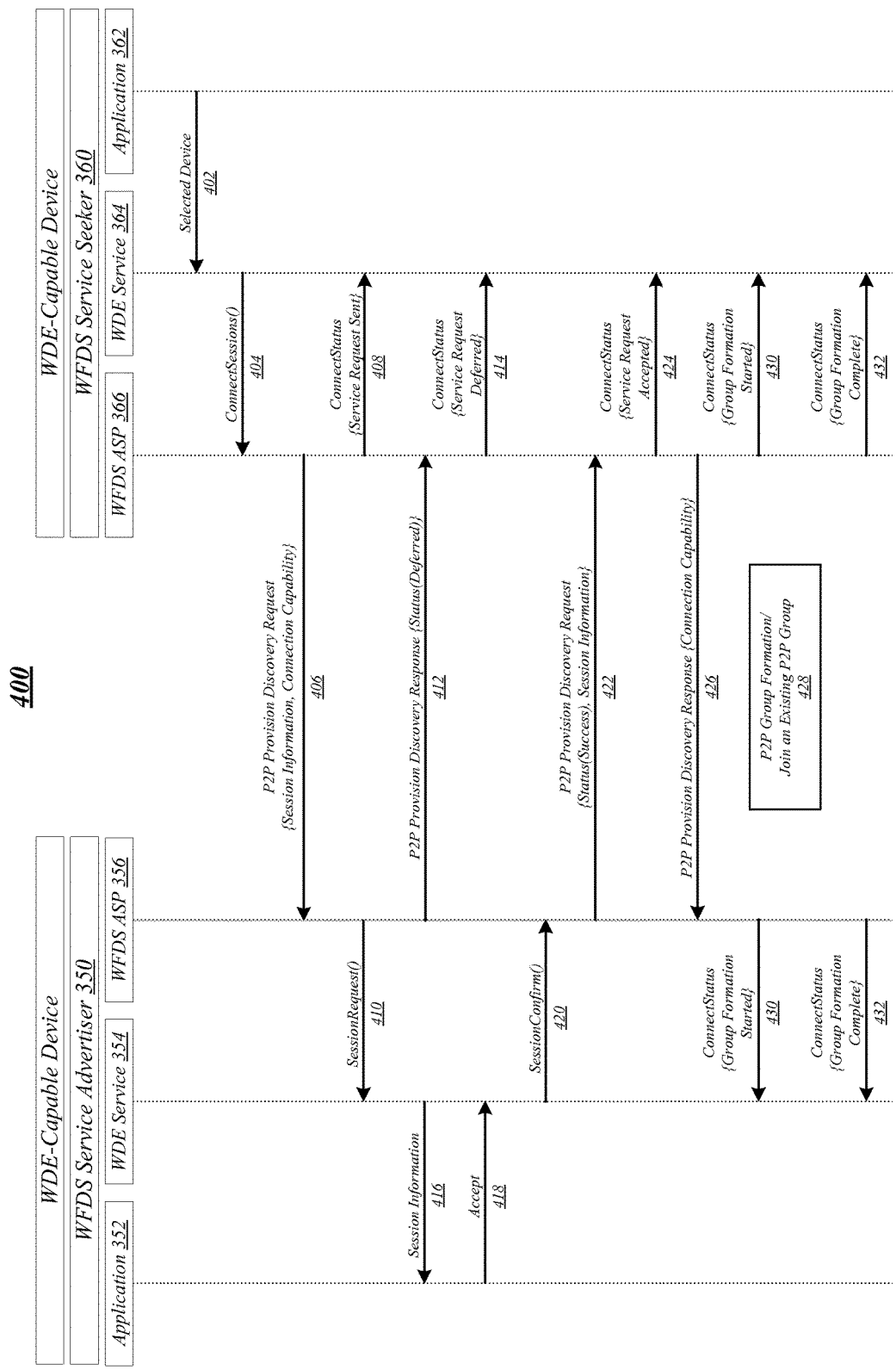
FIG. 4 illustrates one embodiment of a second communications flow.

FIG. 4 illustrates a communications flow 400 that may be representative of a second phase of a WDE service setup process such as may be performed in some embodiments to enable the establishment of a WDE link, such as WDE link 106 of FIG. 1. More particularly, communications flow 400 may be representative of a P2P connection setup phase of such a WDE service setup process, and illustrates communications that may be exchanged during the P2P connection setup phase by the same WDE-capable devices as those that exchange communications in communications flow 300 of FIG. 3.

Communications flow 400 may begin at 402, where application module 362 may send a message to WDE service module 364 identifying advertiser 350 as a device from which it wishes to obtain a WDE service identified via communications flow 300 of FIG. 3. At 404, WDE service module 364 may send a ConnectSessions( ) command to WFDS ASP module 366, to instruct WFDS ASP module 366 to attempt to establish a P2P connection with advertiser 350. In various embodiments, the ConnectSessions( ) command may comprise the format ConnectSessions(List of(service_mac, advertisement_id), session_information, network_role), where the service_mac, advertisement_id, session_information, and network_role parameters are defined in Section 3.6 of the WFDS Technical Specification.

At 406, WFDS ASP module 366 may send a P2P Provision Discovery Request to WFDS ASP module 356. The P2P Provision Discovery Request may comprise session information corresponding to that contained in the ConnectSessions( ) command sent by WDE service module 364 at 404, and may comprise connection capabilities information for the seeker 360. At 408, WFDS ASP module 366 may send a ConnectStatus message to WDE service module 364 that indicates that the P2P Provision Discovery Request has been sent to the advertiser 350.

At 410, following receipt of the P2P Provision Discovery Request, WFDS ASP module 356 may send a SessionRequest( ) message to WDE service module 354 to inform WDE service module 354 of the receipt of the P2P Provision Discovery Request and of the session information comprised within. In some embodiments, the SessionRequest( ) message may comprise the format SessionRequest(advertisement_id, session_mac, session_device_name, session_id, session_information), where the advertisement_id, session_mac, session_device_name, session_id, and session_information parameters are defined in Section 3.6 of the WFDS Technical Specification.

At 412, WFDS ASP module 356 may send a P2P Provision Discovery Response to WFDS ASP module 366 that indicates that the P2P Provision Discovery Request sent by WFDS ASP module 366 at 406 has not yet been processed and thus has a deferred status. At 414, WFDS ASP module 366 may send a ConnectStatus message to WDE service module 364 that informs WDE service module 364 of the deferred status of the previously transmitted P2P Provision Discovery Request. At 416, WDE service module 354 may send a Session Information message to application module 352 that describes a P2P connection that seeker 360 wishes to establish with advertiser 350. The Session Information message may comprise information corresponding to the session_information parameter in the SessionRequest( ) message received at 410.

At 418, application module 352 may send a message to WDE service module 354 to indicate that it wishes to accept the request from seeker 360. At 420, WDE service module 354, may send a SessionConfirm( ) message to WFDS ASP module 356 instructing WFDS ASP module 356 to accept the request from seeker 360. The SessionConfirm( ) message may comprise parameters for a P2P connection to be established between advertiser 350 and seeker 360. At 422, WFDS ASP module 356 may send a P2P Provision Discovery Request to WFDS ASP module 366 that indicates that the P2P Provision Discovery Request sent at 406 has been accepted. This P2P Provision Discovery Request may include session information comprising parameters contained in the SessionConfirm( ) message received at 420.

At 424, WFDS ASP module 366 may send a ConnectStatus message to WDE service module 364 that informs WDE service module 364 of the accepted status of the P2P Provision Discovery Request transmitted at 406. At 426, WFDS ASP module 366 may send a P2P Provision Discovery Response to WFDS ASP module 356. This P2P Provision Discovery Response may include connection capability information for use in establishing a P2P connection between advertiser 350 and seeker 360.

At 428, advertiser 350 and seeker 360 may begin a process by which they become members of a same P2P group in order to establish their P2P connection. In various embodiments they may create and join a new P2P group, while in some other embodiments they may join an existing P2P group. At 430, WFDS ASP module 356 and WFDS ASP module 366 may send respective ConnectStatus messages to WDE service module 354 and WDE service module 364 to inform them that P2P group formation has started. At 432, upon completion of P2P group formation, WFDS ASP module 356 and WFDS ASP module 366 may send respective ConnectStatus messages to WDE service module 354 and WDE service module 364 to inform them that P2P group formation has completed.

Figure 5:
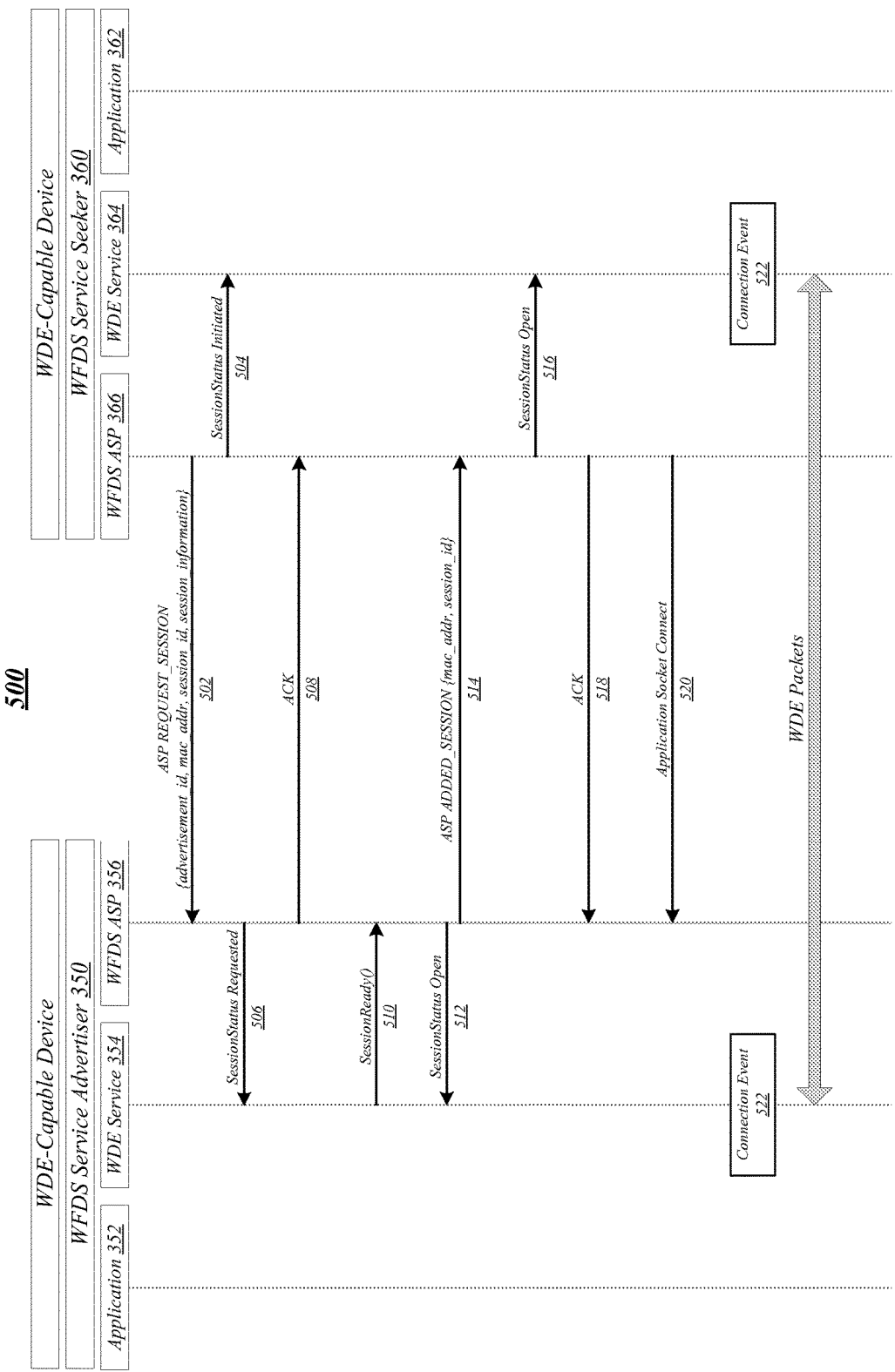
FIG. 5 illustrates one embodiment of a third communications flow.

FIG. 5 illustrates a communications flow 500 that may be representative of a third phase of a WDE service setup process such as may be performed in various embodiments to enable the establishment of a WDE link, such as WDE link 106 of FIG. 1. More particularly, communications flow 500 may be representative of an ASP session setup phase of such a WDE service setup process, and illustrates communications that may be exchanged during the ASP session setup phase by the same WDE-capable devices as those that exchange communications in communications flow 300 of FIG. 3 and communications flow 400 of FIG. 4.

Communications flow 500 may begin at 502, where WFDS ASP module 366 may send an ASP REQUEST_SESSION message to WFDS ASP module 356. The ASP REQUEST_SESSION message may include advertisement_id, mac_addr, session_id, and session_information parameters, each of which may comprise information that is the same as or similar to the respective parameter in the SessionRequest( ) message sent at 410 in FIG. 4.

At 504, WFDS ASP module 366 may send a SessionStatus message to WDE service module 364 that indicates that it has sent the ASP REQUEST_SESSION message to WFDS ASP module 356 and thus has initiated ASP session establishment. At 506, WFDS ASP module 356 may send a SessionStatus message to WDE service module 354 that indicates that the ASP REQUEST_SESSION message has been received. At 508, WFDS ASP module 356 may send an acknowledgment (ACK) to WFDS ASP module 366, in order to confirm receipt of the ASP REQUEST_SESSION message.

At 510, WDE service module 354 may send a SessionReady( ) message to WFDS ASP module 356 that indicates that the desired ASP session has been created. At 512, WFDS ASP module 356 may send a SessionStatus message to WDE service module 354 that indicates that the ASP session is open and may be used. At 514, WFDS ASP module 356 may send an ASP ADDED_SESSION message to WFDS ASP module 366. The ASP ADDED_SESSION message may include mac_addr and session_id parameters, each of which may comprise information that is the same as or similar to the respective parameter in the ASP REQUEST_ SESSION message sent at 502.

At 516, WFDS ASP module 366 may send a SessionStatus message to WDE service module 364 that indicates that the ASP session is open and may be used. At 518, WFDS ASP module 366 may send an ACK to WFDS ASP module 356, in order to confirm receipt of the ASP ADDED_SESSION message. At 520, WFDS ASP module 366 may send an application socket connect message to WFDS ASP module 356 in order enable data exchange between application module 352 and application module 362. Following a connection event at 522, advertiser 350 and seeker 360 may begin to exchange WDE packets.

Figure 6:
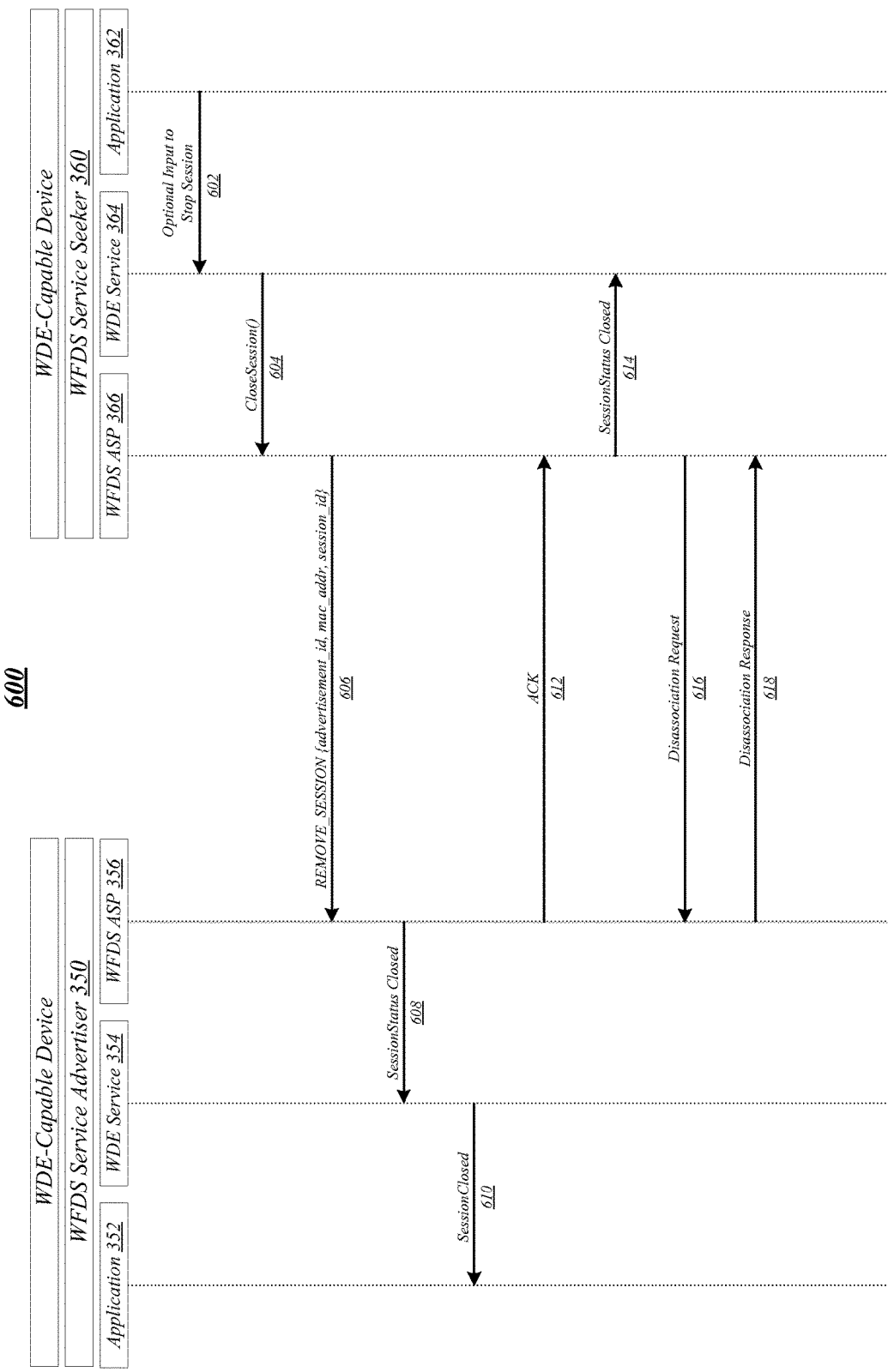
FIG. 6 illustrates one embodiment of a fourth communications flow.

FIG. 6 illustrates a communications flow 600 that may be representative of a WDE service teardown process such as may be performed in some embodiments in order to terminate a WDE service, such as a WDE service created via the various WDE service setup process phases described in FIGS. 3-5. More particularly, communications flow 600 illustrates communications that may be exchanged during the service teardown process by the same WDE-capable devices as those that exchange communications in communications flow 300 of FIG. 3, communications flow 400 of FIG. 4, and communications flow 500 of FIG. 5.

Communications flow 600 may begin at 602, where WDE service module 364 may optionally receive input from application module 362 that indicates that a WDE service session should be stopped. At 604, WDE service module 364 may send a CloseSession( ) instruction to WFDS ASP module 366 that indicates that WFDS ASP module 366 should communicate with WFDS ASP module 356 in order to close the WDE service session. In various embodiments, WDE service module 364 may send the CloseSession( ) instruction in response to input received from application module 362 at 602. In some other embodiments, WDE service module 364 may determine that the WDE service session should be closed based on a received WDE protocol instruction, such as in the event of an internal timeout. In yet other embodiments, WDE service module 364 may determine itself that the WDE service session should be closed, such as in the event of a connection failure event. The embodiments are not limited in this context.

At 606, based on the CloseSession( ) instruction, WFDS ASP module 366 may send a REMOVE_SESSION message to WFDS ASP module 356. The REMOVE_SESSION message may include advertisement_id, mac_addr, and session_id parameters, each of which may comprise information that is the same as or similar to the respective parameter in the ASP REQUEST_SESSION message sent at 502 in FIG. 5. At 608, WFDS ASP module 356 may send a SessionStatus message to WDE service module 354 that indicates that the WDE service session is closed. At 610, WDE service module 354 may in turn send a SessionClosed message to application module 352 to notify application module 352 that the WDE service session is closed.

At 612, WFDS ASP module 356 may send an ACK to WFDS ASP module 366 to confirm receipt of the REMOVE_SESSION message at 606. At 614, WFDS ASP module 366 may send a SessionStatus message to WDE service module 364 that indicates that the WDE service session is closed. At 616, if there are no other sessions still active between advertiser 350 and seeker 360, WFDS ASP module 366 may send a disassociation request WFDS ASP module 356. At 618, WFDS ASP module 356 may respond to the disassociation request by sending a disassociation response to WFDS ASP module 366.

FIG. 7 illustrates a packet structure 700 that may be representative of packets exchanged by a WDE source and a WDE sink in various embodiments. More particularly, packet structure 700 may be representative of an encapsulation of ASP coordination protocol data for MAC-layer exchange. As shown in FIG. 7, packet structure 700 comprises an 802.11 MAC header 702, a logical link control (LLC) header 704, a Sub-network Access Protocol (SNAP) header 712, an ASP coordination protocol data field 718, and a frame check sequence (FCS) field 720.

LLC header 704 comprises a Destination Service Access Point (DSAP) field 706, a Source Service Access Point (SSAP) field 708, and a control field 710. Each of these three fields may comprise one octet, and thus LLC header 704 may comprise a total of three octets. DSAP field 706 and SSAP field 708 may each comprise the hexadecimal value 0xAA, to indicate the presence of SNAP header 712 following LLC header 704. Control field 710 may comprise the hexadecimal value 0x03, to indicate that the packet comprises an unnumbered information (UI) protocol data unit (PDU).

SNAP header 712 may comprise a total of five octets designated for protocol identification, which may include a field 714 and a field 716. Field 714 may comprise three octets that contain a WFA organizationally unique identifier (OUI) hexadecimal value of 0x50-6F-9A. Field 716 may comprise two octets that contain a WFDS OUI Type hexadecimal value of 0x??-00, where the characters "??" represent as yet unassigned digits identifying the WFDS OUI Type. ASP coordination protocol data field 718 may comprise the ASP coordination protocol data that is encapsulated within packet structure 700. FCS field 720 may comprise an FCS value for use in applying error detection to packet structure 700. The embodiments are not limited in this context.

FIG. 8 illustrates a packet structure 800 that may be representative of packets exchanged by a WDE source and a WDE sink in some embodiments. More particularly, packet structure 800 may be representative of an encapsulation of WDE protocol data for MAC-layer exchange. As shown in FIG. 8, packet structure 800 comprises an 802.11 MAC header 802, an LLC header 804, a SNAP header 812, a WDE protocol data field 818, and an FCS field 820. 802.11 MAC header 802, LLC header 804, and FCS field 820 may be the same as or similar to 802.11 MAC header 702, LLC header 704, and FCS field 720 of FIG. 7.

SNAP header 812 may comprise a total of five octets designated for protocol identification. SNAP header 812 may include a three octet field 814 that contains the WFA OUI hexadecimal value of 0x50-6F-9A. SNAP header 812 may also include a two octet field 816 that contains a WDE OUI Type hexadecimal value of 0x??-00, where the characters "??" represent as yet unassigned digits identifying the WDE OUI Type. WDE protocol data field 818 may comprise the WDE protocol data that is encapsulated within packet structure 800. The embodiments are not limited in this context.

FIG. 9 illustrates an embodiment of a storage medium 900. The storage medium 900 may comprise an article of manufacture. In one embodiment, the storage medium 900 may comprise any non-transitory computer-readable medium or machine-readable medium, such as an optical, magnetic or semiconductor storage. The storage medium may store various types of computer-executable instructions 902, such as instructions that, when executed, cause a device to perform communications according to communications flow 300 of FIG. 3, communications flow 400 of FIG. 4, communications flow 500 of FIG. 5, and/or communications flow 600 of FIG. 6. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
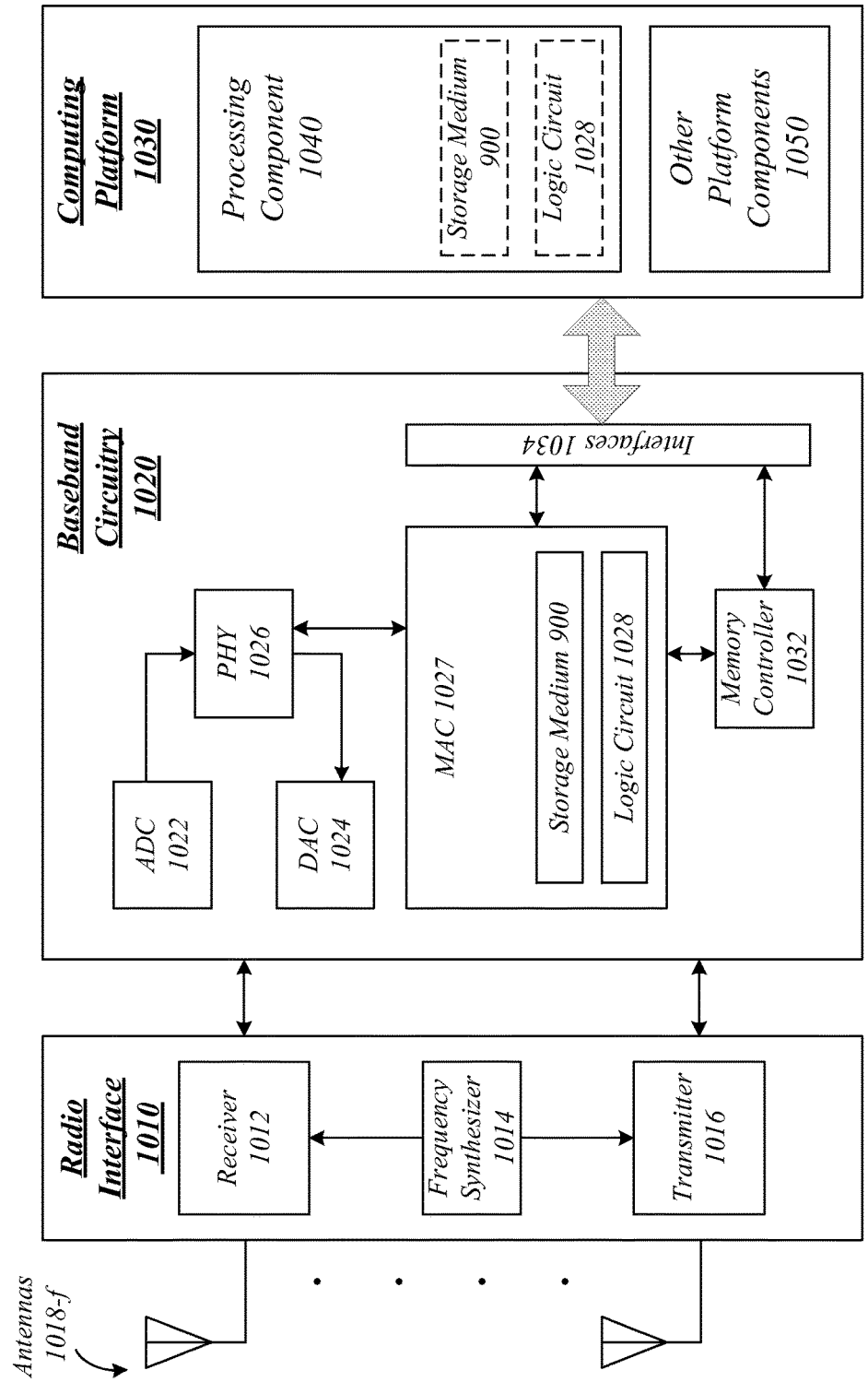
FIG. 10 illustrates one embodiment of a device.

FIG. 10 illustrates an embodiment of a communications device 1000 that may communicate over a WFDS-supported WDE link in various embodiments. In some embodiments, device 1000 may implement one or more of WDE source 102, WDE sink 108, WFDS service advertiser 350, WFDS service seeker 360, and storage medium 900. In various embodiments, device 1000 may comprise a logic circuit 1028. The logic circuit 1028 may include physical circuits to perform operations described for one or more of WDE source 102, WDE sink 108, WFDS service advertiser 350, and WFDS service seeker 360, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of WDE source 102, WDE sink 108, WFDS service advertiser 350, WFDS service seeker 360, storage medium 900, and logic circuit 1028 in a single computing entity, such as entirely within a single device. Alternatively, the device 1000 may distribute portions of the structure and/or operations for one or more of WDE source 102, WDE sink 108, WFDS service advertiser 350, WFDS service seeker 360, storage medium 900, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of WDE source 102, WDE sink 108, WFDS service advertiser 350, WFDS service seeker 360, storage medium 900, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-f) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Operations for the above embodiments may be further described with reference to the following FIGURES and accompanying examples. Some of the FIGURES may include a logic flow. Although such FIGURES presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 11:
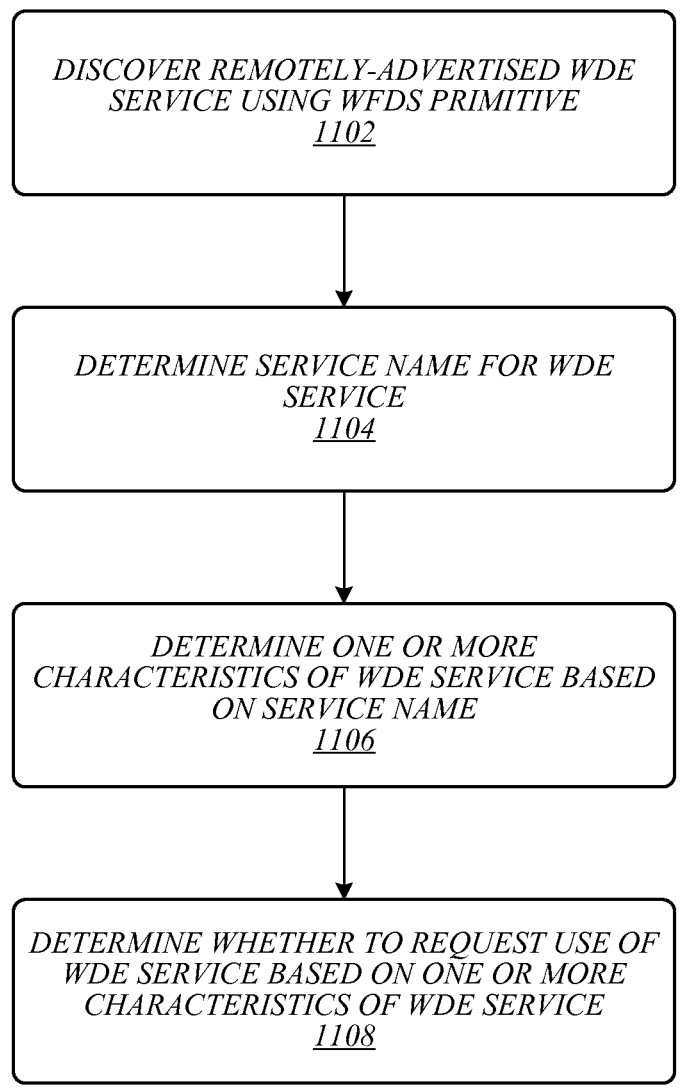
FIG. 11 illustrates one embodiment of a first logic flow.

FIG. 11 illustrates one embodiment of a logic flow 1100, which may be representative of operations that may be performed in various embodiments. More particularly, logic flow 1100 may be representative of operations that may be performed in some embodiments by a device acting as WFDS service seeker 360 of FIGS. 3-5. For example, in various embodiments, device 1000 of FIG. 10 may act as WFDS service seeker 360 of FIGS. 3-5 and may perform the operations of logic flow 1100. In some embodiments, a storage medium may comprise a set of instructions that, in response to being executed on a computing device, cause the computing device to perform the operations of logic flow 1100. For example, in various embodiments, storage medium 900 of FIG. 9 may comprise computer-executable instructions 902 for performing the operations of logic flow 1100, and device 1000 of FIG. 10 may be operative to perform the operations of logic flow 1100 in conjunction with executing those instructions. The embodiments are not limited in this context.

As shown in logic flow 1100, a remotely-advertised WDE service may be discovered at 1102 using a WEDS primitive. For example, WFDS service seeker 360 may utilize a WFDS primitive to discover a WDE service advertised by WEDS service advertiser 350. At 1104, a service name for the WDE service may be determined. For example, WFDS service seeker 360 may determine a service_name parameter for the WDE service advertised by WFDS service advertiser 350. At 1106, one or more characteristics of the WDE service may be determined based on the service name. For example, WFDS service seeker 360 may determine whether WFDS service advertiser 350 comprises a WDE source or a WDE sink with respect to the advertised WDE service, based on the service_name parameter. At 1108, it may be determined whether to request use of the WDE service, based on the one or more characteristics of the WDE service. For example, WFDS service seeker 360 may determine whether to request use of the WDE service advertised by WEDS service advertiser 350 based on whether WEDS service advertiser 350 comprises a WDE source or a WDE sink with respect to the advertised WDE service. The embodiments are not limited to these examples.

Figure 12:
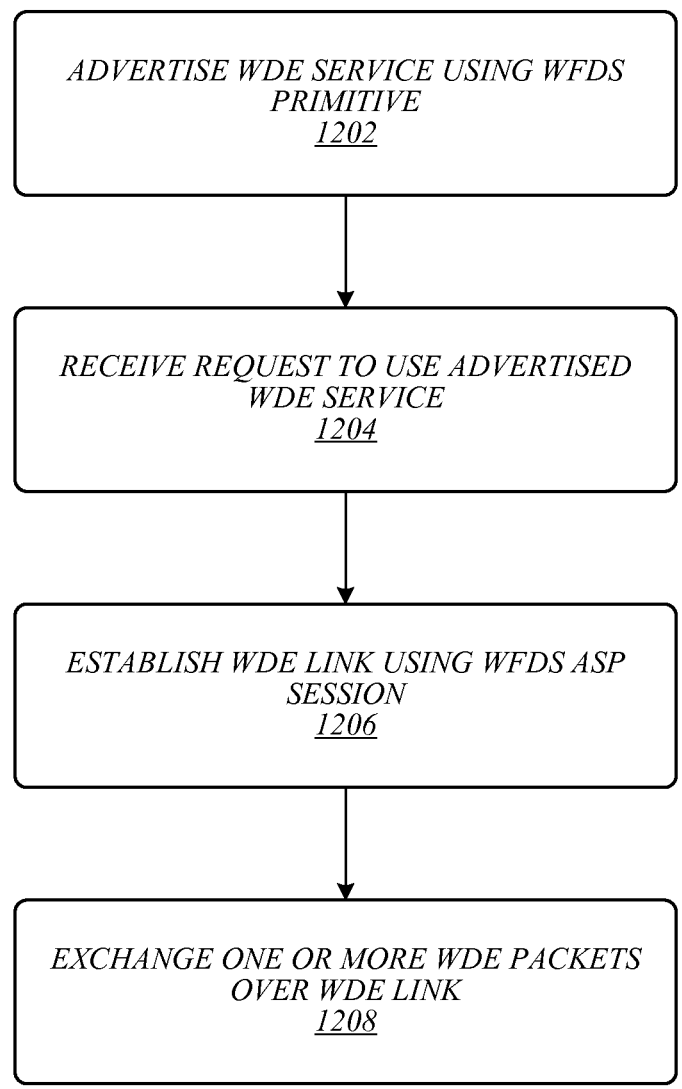
FIG. 12 illustrates one embodiment of a second logic flow.

FIG. 12 illustrates one embodiment of a logic flow 1200, which may be representative of operations that may be performed in some embodiments. More particularly, logic flow 1200 may be representative of operations that may be performed in various embodiments by a device acting as WFDS service advertiser 350 of FIGS. 3-5. For example, in some embodiments, device 1000 of FIG. 10 may act as WFDS service advertiser 350 of FIGS. 3-5 and may perform the operations of logic flow 1200. In various embodiments, a storage medium may comprise a set of instructions that, in response to being executed on a computing device, cause the computing device to perform the operations of logic flow 1200. For example, in some embodiments, storage medium 900 of FIG. 9 may comprise computer-executable instructions 902 for performing the operations of logic flow 1200, and device 1000 of FIG. 10 may be operative to perform the operations of logic flow 1200 in conjunction with executing those instructions. The embodiments are not limited in this context.

As shown in logic flow 1200, a WDE service may be advertised at 1202 using a WFDS primitive. For example, WFDS service advertiser 350 may utilize a WFDS primitive to advertise a WDE service. At 1204, a request to use the advertised WDE service may be received. For example, WFDS service advertiser 350 may receive a request from WFDS service seeker 360 to use the advertised WDE service. At 1206, a WDE link may be established using a WEDS ASP session. For example, WFDS service advertiser 350 may use a WFDS ASP session to establish a WDE link with WFDS service seeker 360. At 1208, one or more WDE packets may be exchanged over the WDE link. For example, WFDS service advertiser 350 may exchange one or more WDE packets over the WDE link with WFDS service seeker 360. The embodiments are not limited to these examples.

Figure 13:
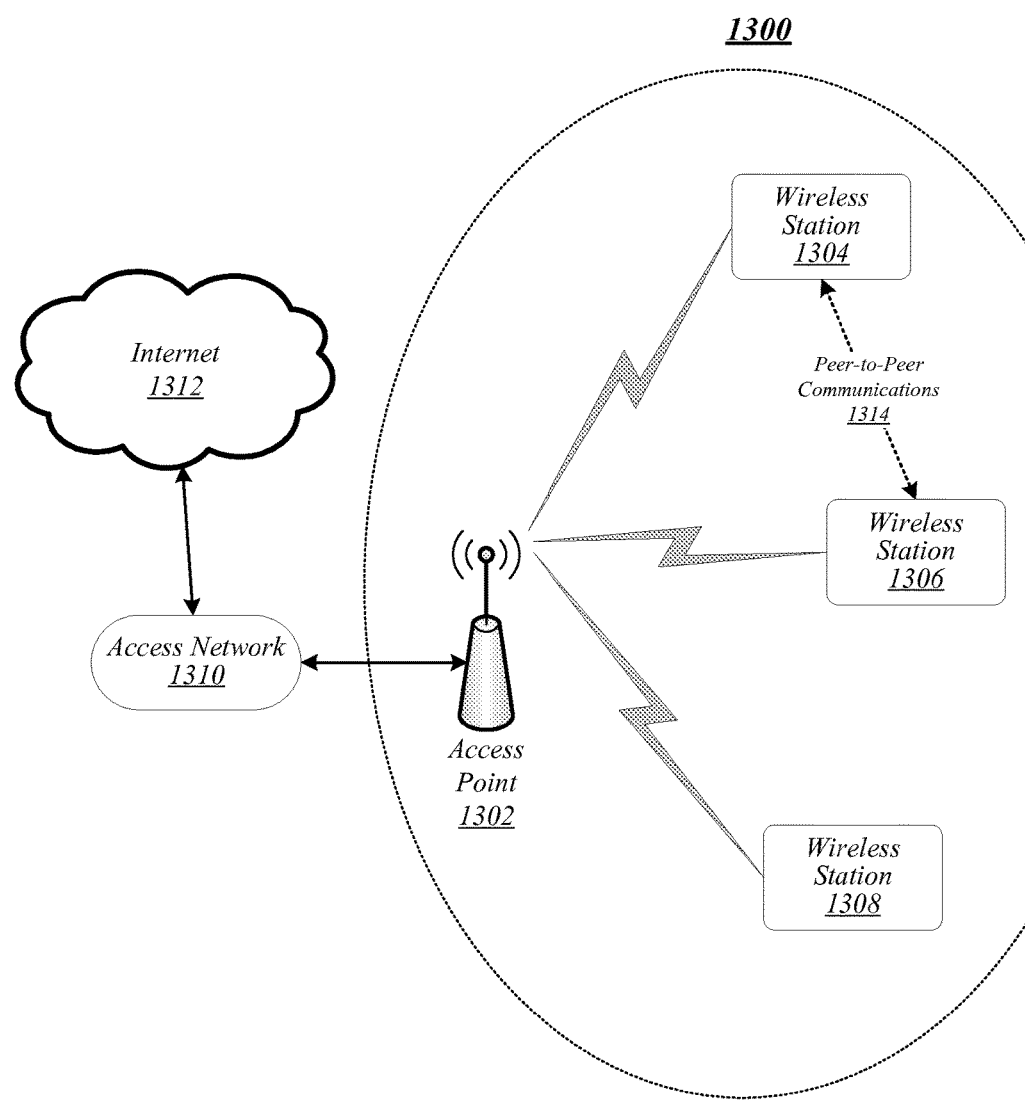
FIG. 13 illustrates one embodiment of a wireless network.

FIG. 13 illustrates an embodiment of a wireless network 1300. As shown in FIG. 13, wireless network comprises an access point 1302 and wireless stations 1304, 1306, and 1308. In various embodiments, wireless network 1300 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1300 may comprise another type of wireless network, and/or may implement other wireless communications standards. In various embodiments, for example, wireless network 1000 may comprise a WWAN or WPAN rather than a WLAN. The embodiments are not limited to this example.

In some embodiments, wireless network 1300 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency- Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1304, 1306, and 1308 may communicate with access point 1302 in order to obtain connectivity to one or more external data networks. In some embodiments, for example, wireless stations 1304, 1306, and 1308 may connect to the Internet 1312 via access point 1302 and access network 1310. In various embodiments, access network 1310 may comprise a private network that provides subscription-based Internet-connectivity, such as an Internet Service Provider (ISP) network. The embodiments are not limited to this example.

In various embodiments, two or more of wireless stations 1304, 1306, and 1308 may communicate with each other directly by exchanging peer-to-peer communications. For example, in the example of FIG. 13, wireless stations 1304 and 1306 communicate with each other directly by exchanging peer-to-peer communications 1314. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising logic, at least a portion of which is in hardware, the logic to discover a remotely-advertised Wireless Gigabit Display Extension (WDE) service using a Wi-Fi Direct Services (WFDS) primitive, identify a service name for the WDE service, determine, based on the service name, one or more characteristics of the WDE service, and determine whether to request use of the WDE service based on the one or more characteristics of the WDE service.

In Example 2, the one or more characteristics of Example 1 may optionally indicate whether the WDE service is provided by a WDE source or a WDE sink.

In Example 3, the one or more characteristics of any of Examples 1 to 2 may optionally indicate whether an advertiser of the WDE service supports the use of a High-Definition Multimedia Interface (HDMI) interface.

In Example 4, the one or more characteristics of any of Examples 1 to 3 may optionally indicate whether an advertiser of the WDE service supports the use of a DisplayPort interface.

In Example 5, the one or more characteristics of any of Examples 1 to 4 may optionally indicate whether an advertiser of the WDE service supports an exchange of video data, an exchange of audio data, or both.

In Example 6, the logic of any of Examples 1 to 5 may optionally establish a peer-to-peer (P2P) connection with an advertiser of the WDE service, establish a WFDS application service platform (ASP) session with the advertiser of the WDE service, and exchange WDE protocol data with the advertiser of the WDE service via the WFDS ASP session.

In Example 7, the logic of Example 6 may optionally perform a service teardown procedure to terminate the WDE service.

In Example 8, the WDE protocol data of any of Examples 6 to 7 may optionally be encapsulated within a medium access control (MAC)-layer packet structure.

In Example 9, the MAC-layer packet structure of Example 8 may optionally comprise a logical link control (LLC) header.

In Example 10, the LLC header of Example 9 may optionally comprise a destination service access point (DSAP) field and a source service access point (SSAP) field.

In Example 11, the DSAP field and the SSAP field of Example 10 may optionally each comprise a value to indicate a presence of a sub-network access protocol (SNAP) header following the LLC header.

In Example 12, the LLC header of any of Examples 9 to 11 may optionally comprise a control field containing a value to indicate that the packet structure comprises an unnumbered information (UI) protocol data unit (PDU).

In Example 13, the MAC-layer packet structure of any of Examples 8 to 12 may optionally comprise a sub-network access protocol (SNAP) header.

In Example 14, the SNAP header of Example 13 may optionally comprise values to indicate that the MAC-layer packet structure comprises a WDE protocol data encapsulation.

In Example 15, the SNAP header of any of Examples 13 to 14 may optionally comprise five octets.

In Example 16, the logic of any of Examples 6 to 15 may optionally exchange WFDS ASP coordination protocol data with the advertiser of the WDE service.

In Example 17, the WFDS ASP coordination protocol data of Example 16 may optionally be encapsulated within a medium access control (MAC)-layer packet structure.

In Example 18, the MAC-layer packet structure of Example 17 may optionally comprise a logical link control (LLC) header.

In Example 19, the LLC header of Example 18 may optionally comprise a destination service access point (DSAP) field and a source service access point (SSAP) field.

In Example 20, the DSAP field and the SSAP field of Example 19 may optionally each comprise a value to indicate a presence of a sub-network access protocol (SNAP) header following the LLC header.

In Example 21, the LLC header of any of Examples 18 to 20 may optionally comprise a control field containing a value to indicate that the packet structure comprises an unnumbered information (UI) protocol data unit (PDU).

In Example 22, the MAC-layer packet structure of any of Examples 17 to 21 may optionally comprise a sub-network access protocol (SNAP) header.

In Example 23, the SNAP header of Example 22 may optionally comprise values to indicate that the MAC-layer packet structure comprises a WFDS ASP coordination protocol data encapsulation.

In Example 24, the SNAP header of any of Examples 22 to 23 may optionally comprise five octets.

Example 25 is a system, comprising a wireless communication apparatus according to any of Examples 1 to 24 and one or more radio frequency (RF) transceivers.

In Example 26, the system of Example 25 may optionally comprise one or more RF antennas.

Example 27 is a system according to any of Examples 25 to 26, comprising a display.

Example 28 is at least one non-transitory computer-readable storage medium, comprising a set of wireless communication instructions that, in response to being executed on a computing device, cause the computing device to discover a remotely-advertised Wireless Gigabit Display Extension (WDE) service using a Wi-Fi Direct Services (WFDS) primitive, identify a service name for the WDE service, determine one or more characteristics of the WDE service based on the service name, and determine whether to request use of the WDE service based on the one or more characteristics of the WDE service.

In Example 29, the one or more characteristics of Example 28 may optionally indicate whether the WDE service is provided by a WDE source or a WDE sink.

In Example 30, the one or more characteristics of any of Examples 28 to 29 may optionally indicate whether an advertiser of the WDE service supports the use of a High-Definition Multimedia Interface (HDMI) interface.

In Example 31, the one or more characteristics of any of Examples 28 to 30 may optionally indicate whether an advertiser of the WDE service supports the use of a DisplayPort interface.

In Example 32, the one or more characteristics of any of Examples 28 to 31 may optionally indicate whether an advertiser of the WDE service supports an exchange of video data, an exchange of audio data, or both.

In Example 33, the at least one non-transitory computer-readable storage medium of any of Examples 28 to 32 may optionally comprise wireless communication instructions that, in response to being executed on the computing device, cause the computing device to establish a peer-to-peer (P2P) connection with an advertiser of the WDE service, establish a WFDS application service platform (ASP) session with the advertiser of the WDE service, and exchange WDE protocol data with the advertiser of the WDE service via the WFDS ASP session.

In Example 34, the at least one non-transitory computer-readable storage medium of Example 33 may optionally comprise wireless communication instructions that, in response to being executed on the computing device, cause the computing device to perform a service teardown procedure to terminate the WDE service.

In Example 35, the WDE protocol data of any of Examples 33 to 34 may optionally be encapsulated within a medium access control (MAC)-layer packet structure.

In Example 36, the MAC-layer packet structure of Example 35 may optionally comprise a logical link control (LLC) header.

In Example 37, the LLC header of Example 36 may optionally comprise a destination service access point (DSAP) field and a source service access point (SSAP) field.

In Example 38, the DSAP field and the SSAP field of Example 37 may optionally each comprise a value to indicate a presence of a sub-network access protocol (SNAP) header following the LLC header.

In Example 39, the LLC header of any of Examples 36 to 38 may optionally comprise a control field containing a value to indicate that the packet structure comprises an unnumbered information (UI) protocol data unit (PDU).

In Example 40, the MAC-layer packet structure of any of Examples 35 to 39 may optionally comprise a sub-network access protocol (SNAP) header.

In Example 41, the SNAP header of Example 40 may optionally comprise values to indicate that the MAC-layer packet structure comprises a WDE protocol data encapsulation.

In Example 42, the SNAP header of any of Examples 40 to 41 may optionally comprise five octets.

In Example 43, the at least one non-transitory computer-readable storage medium of any of Examples 33 to 42 may optionally comprise wireless communication instructions that, in response to being executed on the computing device, cause the computing device to exchange WFDS ASP coordination protocol data with the advertiser of the WDE service.

In Example 44, the WFDS ASP coordination protocol data of Example 43 may optionally be encapsulated within a medium access control (MAC)-layer packet structure.

In Example 45, the MAC-layer packet structure of Example 44 may optionally comprise a logical link control (LLC) header.

In Example 46, the LLC header of Example 45 may optionally comprise a destination service access point (DSAP) field and a source service access point (SSAP) field.

In Example 47, the DSAP field and the SSAP field of Example 46 may optionally each comprise a value to indicate a presence of a sub-network access protocol (SNAP) header following the LLC header.

In Example 48, the LLC header of any of Examples 45 to 47 may optionally comprise a control field containing a value to indicate that the packet structure comprises an unnumbered information (UI) protocol data unit (PDU).

In Example 49, the MAC-layer packet structure of any of Examples 44 to 48 may optionally comprise a sub-network access protocol (SNAP) header.

In Example 50, the SNAP header of Example 49 may optionally comprise values to indicate that the MAC-layer packet structure comprises a WFDS ASP coordination protocol data encapsulation.

In Example 51, the SNAP header of any of Examples 49 to 50 may optionally comprise five octets.

Example 52 is a wireless communication method, comprising discovering a remotely-advertised Wireless Gigabit Display Extension (WDE) service using a Wi-Fi Direct Services (WFDS) primitive, identifying a service name for the WDE service, determining one or more characteristics of the WDE service based on the service name, and determining, by a processor circuit, whether to request use of the WDE service, based on the one or more characteristics of the WDE service.

In Example 53, the one or more characteristics of Example 52 may optionally indicate whether the WDE service is provided by a WDE source or a WDE sink.

In Example 54, the one or more characteristics of any of Examples 52 to 53 may optionally indicate whether an advertiser of the WDE service supports the use of a High-Definition Multimedia Interface (HDMI) interface.

In Example 55, the one or more characteristics of any of Examples 52 to 54 may optionally indicate whether an advertiser of the WDE service supports the use of a DisplayPort interface.

In Example 56, the one or more characteristics of any of Examples 52 to 55 may optionally indicate whether an advertiser of the WDE service supports an exchange of video data, an exchange of audio data, or both.

In Example 57, the wireless communication method of any of Examples 52 to 56 may optionally comprise establishing a peer-to-peer (P2P) connection with an advertiser of the WDE service, establishing a WFDS application service platform (ASP) session with the advertiser of the WDE service, and exchanging WDE protocol data with the advertiser of the WDE service via the WFDS ASP session.

In Example 58, the wireless communication method of Example 57 may optionally comprise performing a service teardown procedure to terminate the WDE service.

In Example 59, the WDE protocol data of any of Examples 57 to 58 may optionally be encapsulated within a medium access control (MAC)-layer packet structure.

In Example 60, the MAC-layer packet structure of Example 59 may optionally comprise a logical link control (LLC) header.

In Example 61, the LLC header of Example 60 may optionally comprise a destination service access point (DSAP) field and a source service access point (SSAP) field.

In Example 62, the DSAP field and the SSAP field of Example 61 may optionally each comprise a value to indicate a presence of a sub-network access protocol (SNAP) header following the LLC header.

In Example 63, the LLC header of any of Examples 60 to 62 may optionally comprise a control field containing a value to indicate that the packet structure comprises an unnumbered information (UI) protocol data unit (PDU).

In Example 64, the MAC-layer packet structure of any of Examples 59 to 63 may optionally comprise a sub-network access protocol (SNAP) header.

In Example 65, the SNAP header of Example 64 may optionally comprise values to indicate that the MAC-layer packet structure comprises a WDE protocol data encapsulation.

In Example 66, the SNAP header of any of Examples 64 to 65 may optionally comprise five octets.

In Example 67, the wireless communication method of any of Examples 57 to 66 may optionally comprise exchanging WFDS ASP coordination protocol data with the advertiser of the WDE service.

In Example 68, the WFDS ASP coordination protocol data of Example 67 may optionally be encapsulated within a medium access control (MAC)-layer packet structure.

In Example 69, the MAC-layer packet structure of Example 68 may optionally comprise a logical link control (LLC) header.

In Example 70, the LLC header of Example 69 may optionally comprise a destination service access point (DSAP) field and a source service access point (SSAP) field.

In Example 71, the DSAP field and the SSAP field of Example 70 may optionally each comprise a value to indicate a presence of a sub-network access protocol (SNAP) header following the LLC header.

In Example 72, the LLC header of any of Examples 69 to 71 may optionally comprise a control field containing a value to indicate that the packet structure comprises an unnumbered information (UI) protocol data unit (PDU).

In Example 73, the MAC-layer packet structure of any of Examples 68 to 72 may optionally comprise a sub-network access protocol (SNAP) header.

In Example 74, the SNAP header of Example 73 may optionally comprise values to indicate that the MAC-layer packet structure comprises a WFDS ASP coordination protocol data encapsulation.

In Example 75, the SNAP header of any of Examples 73 to 74 may optionally comprise five octets.

Example 76 is at least one non-transitory computer-readable storage medium, comprising a set of instructions that, in response to being executed on a computing device, cause the computing device to perform a wireless communication method according to any of Examples 52 to 75.

Example 77 is an apparatus, comprising means for performing a wireless communication method according to any of Examples 52 to 75.

Example 78 is a system, comprising an apparatus according to Example 77, and one or more radio frequency (RF) transceivers.

In Example 79, the system of Example 78 may optionally comprise one or more RF antennas.

Example 80 is a system according to any of Examples 78 to 79, comprising a display.

Example 81 is a wireless communication apparatus, comprising means for discovering a remotely-advertised Wireless Gigabit Display Extension (WDE) service using a Wi-Fi Direct Services (WFDS) primitive, means for identifying a service name for the WDE service, means for determining one or more characteristics of the WDE service based on the service name, and means for determining whether to request use of the WDE service based on the one or more characteristics of the WDE service.

In Example 82, the one or more characteristics of Example 81 may optionally indicate whether the WDE service is provided by a WDE source or a WDE sink.

In Example 83, the one or more characteristics of any of Examples 81 to 82 may optionally indicate whether an advertiser of the WDE service supports the use of a High-Definition Multimedia Interface (HDMI) interface.

In Example 84, the one or more characteristics of any of Examples 81 to 83 may optionally indicate whether an advertiser of the WDE service supports the use of a DisplayPort interface.

In Example 85, the one or more characteristics of any of Examples 81 to 84 may optionally indicate whether an advertiser of the WDE service supports an exchange of video data, an exchange of audio data, or both.

In Example 86, the wireless communication apparatus of any of Examples 81 to 85 may optionally comprise means for establishing a peer-to-peer (P2P) connection with an advertiser of the WDE service, means for establishing a WFDS application service platform (ASP) session with the advertiser of the WDE service, and means for exchanging WDE protocol data with the advertiser of the WDE service via the WFDS ASP session.

In Example 87, the wireless communication apparatus of Example 86 may optionally comprise means for performing a service teardown procedure to terminate the WDE service.

In Example 88, the WDE protocol data of any of Examples 86 to 87 may optionally be encapsulated within a medium access control (MAC)-layer packet structure.

In Example 89, the MAC-layer packet structure of Example 88 may optionally comprise a logical link control (LLC) header.

In Example 90, the LLC header of Example 89 may optionally comprise a destination service access point (DSAP) field and a source service access point (SSAP) field.

In Example 91, the DSAP field and the SSAP field of Example 90 may optionally each comprise a value to indicate a presence of a sub-network access protocol (SNAP) header following the LLC header.

In Example 92, the LLC header of any of Examples 89 to 91 may optionally comprise a control field containing a value to indicate that the packet structure comprises an unnumbered information (UI) protocol data unit (PDU).

In Example 93, the MAC-layer packet structure of any of Examples 88 to 92 may optionally comprise a sub-network access protocol (SNAP) header.

In Example 94, the SNAP header of Example 93 may optionally comprise values to indicate that the MAC-layer packet structure comprises a WDE protocol data encapsulation.

In Example 95, the SNAP header of any of Examples 93 to 94 may optionally comprise five octets.

In Example 96, the wireless communication apparatus of any of Examples 86 to 95 may optionally comprise means for exchanging WFDS ASP coordination protocol data with the advertiser of the WDE service.

In Example 97, the WFDS ASP coordination protocol data of Example 96 may optionally be encapsulated within a medium access control (MAC)-layer packet structure.

In Example 98, the MAC-layer packet structure of Example 97 may optionally comprise a logical link control (LLC) header.

In Example 99, the LLC header of Example 98 may optionally comprise a destination service access point (DSAP) field and a source service access point (SSAP) field.

In Example 100, the DSAP field and the SSAP field of Example 99 may optionally each comprise a value to indicate a presence of a sub-network access protocol (SNAP) header following the LLC header.

In Example 101, the LLC header of any of Examples 98 to 100 may optionally comprise a control field containing a value to indicate that the packet structure comprises an unnumbered information (UI) protocol data unit (PDU).

In Example 102, the MAC-layer packet structure of any of Examples 97 to 101 may optionally comprise a sub-network access protocol (SNAP) header.

In Example 103, the SNAP header of Example 102 may optionally comprise values to indicate that the MAC-layer packet structure comprises a WFDS ASP coordination protocol data encapsulation.

In Example 104, the SNAP header of any of Examples 102 to 103 may optionally comprise five octets.

Example 105 is a system, comprising an apparatus according to any of Examples 81 to 104 and one or more radio frequency (RF) transceivers.

In Example 106, the system of Example 105 may optionally comprise one or more RF antennas.

Example 107 is a system according to any of Examples 105 to 106, comprising a display.

Example 108 is a wireless communication apparatus, comprising logic, at least a portion of which is in hardware, the logic to advertise a Wireless Gigabit Display Extension (WDE) service using a Wi-Fi Direct Services (WFDS) primitive, receive a request to use the advertised WDE service, establish a WDE link using a WFDS application services platform (ASP) session, and exchange one or more WDE packets over the WDE link.

In Example 109, the logic of Example 108 may optionally advertise the WDE service by sending a peer-to-peer (P2P) message.

In Example 110, the P2P message of Example 109 may optionally comprise a P2P Probe Request.

In Example 111, the P2P message of Example 109 may optionally comprise a P2P Service Discovery Request.

In Example 112, the logic of any of Examples 108 to 111 may optionally receive one or more WDE packets over the WDE link in conjunction with operation as a WDE sink.

In Example 113, the logic of any of Examples 108 to 111 may optionally send one or more WDE packets over the WDE link in conjunction with operation as a WDE source.

In Example 114, the logic of any of Examples 108 to 113 may optionally establish a peer-to-peer (P2P) connection with a seeker of the WDE service.

In Example 115, the logic of any of Examples 108 to 114 may optionally perform a service teardown procedure to terminate the WDE service.

Example 116 is a system, comprising a wireless communication apparatus according to any of Examples 108 to 115 and one or more radio frequency (RF) transceivers.

In Example 117, the system of Example 116 may optionally comprise one or more RF antennas.

Example 118 is a system according to any of Examples 116 to 117, comprising a display.

Example 119 is at least one non-transitory computer-readable storage medium comprising a set of wireless communication instructions that, in response to being executed on a computing device, cause the computing device to advertise a Wireless Gigabit Display Extension (WDE) service using a Wi-Fi Direct Services (WFDS) primitive, receive a request to use the advertised WDE service, establish a WDE link using a WFDS application services platform (ASP) session, and exchange one or more WDE packets over the WDE link.

In Example 120, the at least one non-transitory computer-readable storage medium of Example 119 may optionally comprise wireless communication instructions that, in response to being executed on the computing device, cause the computing device to advertise the WDE service by sending a peer-to-peer (P2P) message.

In Example 121, the P2P message of Example 120 may optionally comprise a P2P Probe Request.

In Example 122, the P2P message of Example 120 may optionally comprise a P2P Service Discovery Request.

In Example 123, the at least one non-transitory computer-readable storage medium of any of Examples 119 to 122 may optionally comprise wireless communication instructions that, in response to being executed on the computing device, cause the computing device to receive one or more WDE packets over the WDE link in conjunction with operation as a WDE sink.

In Example 124, the at least one non-transitory computer-readable storage medium of any of Examples 119 to 122 may optionally comprise wireless communication instructions that, in response to being executed on the computing device, cause the computing device to send one or more WDE packets over the WDE link in conjunction with operation as a WDE source.

In Example 125, the at least one non-transitory computer-readable storage medium of any of Examples 119 to 124 may optionally comprise wireless communication instructions that, in response to being executed on the computing device, cause the computing device to establish a peer-to-peer (P2P) connection with a seeker of the WDE service.

In Example 126, the at least one non-transitory computer-readable storage medium of any of Examples 119 to 125 may optionally comprise wireless communication instructions that, in response to being executed on the computing device, cause the computing device to perform a service teardown procedure to terminate the WDE service.

Example 127 is a wireless communication method, comprising advertising a Wireless Gigabit Display Extension (WDE) service using a Wi-Fi Direct Services (WFDS) primitive, receiving, by a radio frequency (RF) transceiver, a request to use the advertised WDE service, establishing a WDE link using a WFDS application services platform (ASP) session, and exchanging one or more WDE packets over the WDE link.

In Example 128, the wireless communication method of Example 127 may optionally comprise advertising the WDE service by sending a peer-to-peer (P2P) message.

In Example 129, the P2P message of Example 128 may optionally comprise a P2P Probe Request.

In Example 130, the P2P message of Example 128 may optionally comprise a P2P Service Discovery Request.

In Example 131, the wireless communication method of any of Examples 127 to 130 may optionally comprise receiving one or more WDE packets over the WDE link in conjunction with operation as a WDE sink.

In Example 132, the wireless communication method of any of Examples 127 to 131 may optionally comprise sending one or more WDE packets over the WDE link in conjunction with operation as a WDE source.

In Example 133, the wireless communication method of any of Examples 127 to 132 may optionally comprise establishing a peer-to-peer (P2P) connection with a seeker of the WDE service.

In Example 134, the wireless communication method of any of Examples 127 to 133 may optionally comprise performing a service teardown procedure to terminate the WDE service.

Example 135 is at least one non-transitory computer-readable storage medium, comprising a set of instructions that, in response to being executed on a computing device, cause the computing device to perform a wireless communication method according to any of Examples 127 to 134.

Example 136 is an apparatus, comprising means for performing a wireless communication method according to any of Examples 127 to 134.

Example 137 is a system, comprising an apparatus according to Example 136 and one or more radio frequency (RF) transceivers.

In Example 138, the system of Example 137 may optionally comprise one or more RF antennas.

Example 139 is a system according to any of Examples 137 to 138, comprising a display.

Example 140 is a wireless communication apparatus, comprising means for advertising a Wireless Gigabit Display Extension (WDE) service using a Wi-Fi Direct Services (WFDS) primitive, means for receiving a request to use the advertised WDE service, means for establishing a WDE link using a WFDS application services platform (ASP) session, and means for exchanging one or more WDE packets over the WDE link.

In Example 141, the wireless communication apparatus of Example 140 may optionally comprise means for advertising the WDE service by sending a peer-to-peer (P2P) message.

In Example 142, the P2P message of Example 141 may optionally comprise a P2P Probe Request.

In Example 143, the P2P message of Example 141 may optionally comprise a P2P Service Discovery Request.

In Example 144, the wireless communication apparatus of any of Examples 140 to 143 may optionally comprise means for receiving one or more WDE packets over the WDE link in conjunction with operation as a WDE sink.

In Example 145, the wireless communication apparatus of any of Examples 140 to 144 may optionally comprise means for sending one or more WDE packets over the WDE link in conjunction with operation as a WDE source.

In Example 146, the wireless communication apparatus of any of Examples 140 to 145 may optionally comprise means for establishing a peer-to-peer (P2P) connection with a seeker of the WDE service.

In Example 147, the wireless communication apparatus of any of Examples 140 to 146 may optionally comprise means for performing a service teardown procedure to terminate the WDE service.

Example 148 is a system, comprising an apparatus according to any of Examples 140 to 147, and one or more radio frequency (RF) transceivers.

In Example 149, the system of Example 148 may optionally comprise one or more RF antennas.

Example 150 is a system according to any of Examples 148 to 149, comprising a display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
logic, at least a portion of which is in hardware, the logic to:
discover a remotely-advertised Wireless Gigabit Display Extension (WDE) service using a Wi-Fi Direct Services (WFDS) primitive;
identify a service name for the WDE service, the service name to include an element to indicate whether the WDE service is provided by a WDE source or a WDE sink;
determine, based on the service name, one or more characteristics of the WDE service, determining the one or more characteristics to include:
determining that the WDE service is provided by a WDE source when the element comprises a value "source"; and
determining that the WDE service is provided by a WDE sink when the element comprises a value "sink"; and
determine whether to request use of the WDE service, based on the one or more characteristics of the WDE service.

2. The apparatus of claim 1, the one or more characteristics to indicate whether an advertiser of the WDE service supports the use of a High-Definition Multimedia Interface (HDMI) interface.

3. The apparatus of claim 1, the one or more characteristics to indicate whether an advertiser of the WDE service supports the use of a DisplayPort interface.

4. The apparatus of claim 1, the one or more characteristics to indicate whether an advertiser of the WDE service supports an exchange of video data, an exchange of audio data, or both.

5. The apparatus of claim 1, the logic to establish a peer-to-peer (P2P) connection with an advertiser of the WDE service, establish a WFDS application service platform (ASP) session with the advertiser of the WDE service, and exchange WDE protocol data with the advertiser of the WDE service, via the WFDS ASP session.

6. The apparatus of claim 5, the WDE protocol data to be encapsulated within a media access control (MAC)-layer packet structure.

7. The apparatus of claim 1, comprising one or more radio frequency (RF) transceivers.

8. The apparatus of claim 7, comprising one or more RF antennas.

9. The apparatus of claim 7, comprising a display.

10. At least one non-transitory machine-readable medium comprising a set of instructions that, in response to being executed on a computing device, cause the computing device to:
discover a remotely-advertised Wireless Gigabit Display Extension (WDE) service using a Wi-Fi Direct Services (WFDS) primitive;
identify a service name for the WDE service, the service name to include an element to indicate whether the WDE service is provided by a WDE source or a WDE sink;
determine, based on the service name, one or more characteristics of the WDE service, determining the one or more characteristics to include:

determining that the WDE service is provided by a WDE source when the element comprises a value "source"; and determining that the WDE service is provided by a WDE sink when the element comprises a value "sink"; and determine whether to request use of the WDE service, based on the one or more characteristics of the WDE service.

11. The at least one non-transitory machine-readable medium of claim 10, the one or more characteristics to indicate whether an advertiser of the WDE service supports the use of a High-Definition Multimedia Interface (HDMI) interface.

12. The at least one non-transitory machine-readable medium of claim 10, the one or more characteristics to indicate whether an advertiser of the WDE service supports the use of a DisplayPort interface.

13. The at least one non-transitory machine-readable medium of claim 10, the one or more characteristics to indicate whether an advertiser of the WDE service supports an exchange of video data, an exchange of audio data, or both.

14. The at least one non-transitory machine-readable medium of claim 10, comprising instructions that, in response to being executed on the computing device, cause the computing device to:

establish a peer-to-peer (P2P) connection with an advertiser of the WDE service;

establish a WFDS application service platform (ASP) session with the advertiser of the WDE service; and exchange WDE protocol data with the advertiser of the WDE service, via the WFDS ASP session.

15. The at least one non-transitory machine-readable medium of claim 14, the WDE protocol data to be encapsulated within a media access control (MAC)-layer packet structure.

16. The at least one non-transitory machine-readable medium of claim 14, comprising instructions that, in response to being executed on the computing device, cause the computing device to perform a service teardown procedure to terminate the WDE service.

17. A method, comprising:

discovering a remotely-advertised Wireless Gigabit Display Extension (WDE) service using a Wi-Fi Direct Services (WFDS) primitive;

identifying a service name for the WDE service, the service name to include an element to indicate whether the WDE service is provided by a WDE source or a WDE sink;

determining, based on the service name, one or more characteristics of the WDE service, determining the one or more characteristics to include:

determining that the WDE service is provided by a WDE source when the element comprises a value "source"; and determining that the WDE service is provided by a WDE sink when the element comprises a value "sink"; and determining, by a processor circuit, whether to request use of the WDE service, based on the one or more characteristics of the WDE service.

18. The method of claim 17, the one or more characteristics to indicate whether an advertiser of the WDE service supports the use of a High-Definition Multimedia Interface (HDMI) interface.

19. The method of claim 17, the one or more characteristics to indicate whether an advertiser of the WDE service supports the use of a DisplayPort interface.

20. The method of claim 17, the one or more characteristics to indicate whether an advertiser of the WDE service supports an exchange of video data, an exchange of audio data, or both.

21. The method of claim 17, comprising:

establishing a peer-to-peer (P2P) connection with an advertiser of the WDE service;

establishing a WFDS application service platform (ASP) session with the advertiser of the WDE service; and exchanging WDE protocol data with the advertiser of the WDE service, via the WFDS ASP session, the WDE protocol data to be encapsulated within a media access control (MAC)-layer packet structure.

22. The method of claim 21, comprising performing a service teardown procedure to terminate the WDE service.

* * * * *